(12) United States Patent
Hidaka

(10) Patent No.: US 11,193,882 B2
(45) Date of Patent: Dec. 7, 2021

(54) ELLIPSOMETER AND INSPECTION DEVICE FOR SEMICONDUCTOR DEVICE

(71) Applicant: SAMSUNG ELECTRONICS CO., LTD., Suwon-si (KR)

(72) Inventor: Yasuhiro Hidaka, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/036,185

(22) Filed: Sep. 29, 2020

(65) Prior Publication Data
US 2021/0156790 A1   May 27, 2021

(30) Foreign Application Priority Data

Nov. 26, 2019 (JP) .............................. JP2019-212990
Feb. 14, 2020 (KR) ......................... 10-2020-0018249

(51) Int. Cl.
*G01N 21/21* (2006.01)
*G01B 9/02* (2006.01)
*G02B 27/28* (2006.01)
*G01B 11/00* (2006.01)

(52) U.S. Cl.
CPC ........ *G01N 21/211* (2013.01); *G01B 9/02011* (2013.01); *G01B 11/00* (2013.01); *G02B 27/283* (2013.01); *G01B 2210/56* (2013.01); *G01N 2201/0683* (2013.01)

(58) Field of Classification Search
CPC ......... G01N 21/211; G01N 2201/0683; G01B 9/02011; G01B 27/283; G01B 11/00; G01B 2210/56

USPC .................................................. 356/364–369
See application file for complete search history.

(56) References Cited

U.S. PATENT DOCUMENTS

| 4,850,711 | A | * | 7/1989 | Sano ..................... | G01B 11/065 356/632 |
|---|---|---|---|---|---|
| 4,872,758 | A | * | 10/1989 | Miyazaki ............. | G01B 11/065 356/632 |
| 5,335,066 | A | * | 8/1994 | Yamada ............... | G01N 21/211 356/364 |
| 5,596,411 | A | | 1/1997 | Fanton et al. | |
| 5,835,220 | A | * | 11/1998 | Kazama ................... | G01J 4/04 356/369 |

(Continued)

FOREIGN PATENT DOCUMENTS

| JP | H0571923 A | * | 3/1993 | ............. G01B 11/06 |
|---|---|---|---|---|
| JP | 2007248255 A | * | 9/2007 | ............. G01N 21/21 |

*Primary Examiner* — Roy M Punnoose
(74) *Attorney, Agent, or Firm* — Sughrue Mion, PLLC

(57) ABSTRACT

Provided is an ellipsometer including a polarizing optical device configured to separate light, reflected from a sample that is irradiated with illumination light comprising a linearly polarized light, into a first linearly polarized light in a first polarization direction and a second linearly polarized light in a second polarization direction that is orthogonal to the first polarization direction, and a light-receiving optical system configured to calculate an Ψ and Δ, an amplitude ratio and a phase difference of the two polarized light respectively, from an interference fringe formed by interference between the first linearly polarized light and the second linearly polarized light after passing through an analyzing device with transmission axis different from the first polarization direction and the second polarization direction.

20 Claims, 17 Drawing Sheets

(56) References Cited

U.S. PATENT DOCUMENTS

| | | | |
|---|---|---|---|
| 6,134,011 A * | 10/2000 | Klein | G01J 4/04 250/225 |
| 6,856,384 B1 | 2/2005 | Rovira | |
| 7,667,841 B2 | 2/2010 | Opsal | |
| 8,908,180 B2 | 12/2014 | Acher | |

* cited by examiner

ELLIPSOMETER AND INSPECTION DEVICE FOR SEMICONDUCTOR DEVICE

CROSS-REFERENCE TO THE RELATED APPLICATIONS

This application claims priority from Korean Patent Application No. 10-2020-0018249 filed on Feb. 14, 2020 in the Korean Intellectual Property Office and Japanese Patent Application No. 2019-212990 filed on Nov. 26, 2019 in the Japanese Patent Office, the disclosures of which are incorporated herein in their entireties by reference.

BACKGROUND

1. Field

Example embodiments of the present disclosure relate to an ellipsometer and an inspection device for a semiconductor device.

2. Description of Related Art

Since in the case of the ellipsometry, automatic measurement was created, the measurement time has been greatly shortened and the precision has been greatly improved, and spectroscopic ellipsometry using multiple wavelengths in measuring has also been put to practical use. Since the development of ellipsometry, in the non-destructive measurement of thin films or microstructures, the characteristics of being able to measure optical constants such as dimensions of film thickness or refractive indices with high precision may be used, and thus, ellipsometry is widely used in semiconductor manufacturing processes. As an optical critical dimension (OCD) measuring device for measuring the dimension of a microstructure in which the line width of a circuit pattern on a wafer is 10 nm or less, the ellipsometry is used with a length measurement scanning electron beam microscope (SEM) or atomic force microscope (AFM).

Recently, for about a decade, in FinFETs and memories in logic semiconductors, semiconductor circuit structures such as 3D-NAND or the like have progressed to three-dimensionalization and have become more complex structures. Most OCDs use a spectroscopic ellipsometry as a measurement principle, and to obtain the dimensions of the semiconductor circuit structure to be measured or the optical constants of constituent materials, a method in which a model is created to set the dimensions and optical constants of the measurement targets to floating parameters, and the model is fitted to the measurement result to obtain an answer, is used. Therefore, when the structure of the target to be obtained becomes complicated, the number of floating parameters increases. For example, in the measurement by the OCD of the current FinFET, it is necessary to use about 20-30 floating parameters. In general, in the ellipsometry, two values of $\Psi$ (Psi) and $\Delta$(Delta) are obtained as a result of measurement, and both $\Psi$ and $\Delta$ are wavelength dependent. For this reason, in the case of a spectroscopic ellipsometry, the $\Psi$ and $\Delta$ may be expressed by $\Psi(\lambda)$ and $\Delta(\lambda)$.

To obtain the solution of the dimension, it is necessary at least to obtain the number of and A more than the number of floating parameters by measurement in order to fit to the model, but a problem arises when there are a relatively large number of floating parameters. For example, the fitting may converge with a combination of floating parameters that differ from the actual dimensions. This is a problem known as coupling, and in order to avoid this, it is effective to perform fitting by measuring $\Psi$ and $\Delta$ that have different dependences on floating parameters. Therefore, in addition to the wavelength, ellipsometric measurements are performed under conditions in which incident angles and incident directions are different, and the $\Psi$ and $\Delta$ having more different dependence on the above floating parameters are used for fitting the model.

For this reason, in the spectroscopic ellipsometry used in the OCD measuring apparatus in a semiconductor manufacturing process, it is strongly expected to measure $\Psi$ and $\Delta$ in a shorter time and with relatively many measurement conditions.

A spectroscopic ellipsometry used in an OCD measuring apparatus in a semiconductor manufacturing process requires a measurement time of 1 second to several seconds for one point of measurement. For this reason, it is generally caused by requiring a large number of measurement points within a modulation period by a rotating compensator or a phase modulating element used in an ellipsometer. Furthermore, for spectrometric measurement, it is necessary to measure the amount of light divided into respective wavelengths in a dispersion element such as a diffraction grating or the like at a relatively high S/N ratio. Therefore, to fully inspect all of wafers in the manufacturing process, only a few points to several tens of points may be measured in the wafer, and to evaluate the entire surface of the wafer, the combination with a film thickness meter or a macro inspection device is required.

To shorten the measurement time of the spectroscopic ellipsometry to increase the measurement points in the wafer, it is necessary to speed up moving parts such as rotating compensators or the like, but stability and heat generation become obstacles, and thus, improving the throughput of an ellipsometry measurement for OCD measurement or the like is difficult.

SUMMARY

According to an aspect of an example embodiment, there is provided an ellipsometer including a polarizing optical device configured to separate light, reflected from a sample that is irradiated with illumination light comprising a linearly polarized light, into a first linearly polarized light in a first polarization direction and a second linearly polarized light in a second polarization direction that is orthogonal to the first polarization direction, and a light-receiving optical system configured to calculate an $\Psi$(Psi) and $\Delta$(Delta), an amplitude ratio and a phase difference of the two polarized light respectively, from an interference fringe formed by interference between the first linearly polarized light and the second linearly polarized light after passing through an analyzing device with transmission axis different from the first polarization direction and the second polarization direction

BRIEF DESCRIPTION OF DRAWINGS

The above and/or other aspects, features, and advantages of example embodiments will be more clearly understood from the following detailed description, taken in conjunction with the accompanying drawings, in which.

DETAILED DESCRIPTION

Figure 1:
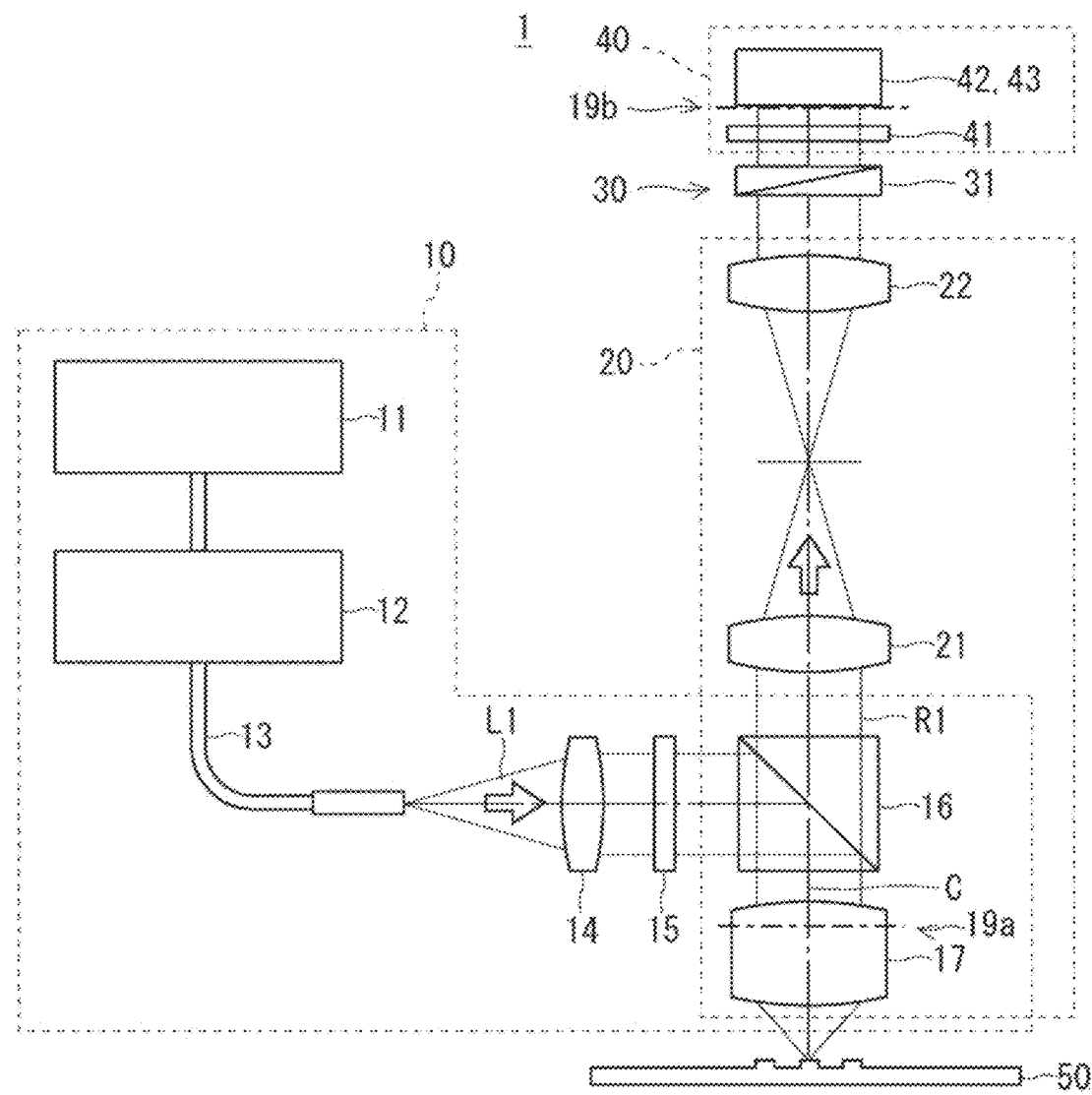
FIG. 1 is a diagram illustrating an ellipsometer according to an example embodiment.

For clarity of descriptions, the following descriptions and drawings are appropriately omitted, and simplified. In addition, in respective drawings, the same reference numerals are assigned to the same elements, and overlapping descriptions are omitted as needed.

An ellipsometer according to an example embodiment will be described. FIG. 1 is a configuration diagram illustrating an ellipsometer according to an example embodiment. As illustrated in FIG. 1, an ellipsometer 1 includes an illumination optical system 10, a receiving optical system 20, a polarizing optical device 30, and a light-receiving optical system 40. The ellipsometer 1 may receive reflected light R1 reflected by illumination light L1 from a sample 50, and measures Ψ and Δ.

The illumination optical system 10 illuminates the sample 50 with the illumination light L1 including linearly polarized light. The illumination optical system 10 includes a light source 11, a monochromator 12, a fiber 13, an illumination lens 14, a polarizer 15, a beam splitter 16, and an objective lens 17. The illumination optical system 10 illuminates the sample 50 with the illumination light L1 including elliptically polarized light according to the example embodiment.

The light source 11 generates the illumination light L1. The illumination light L1 generated by the light source 11 may be, for example, white light. However, the illumination light L1 generated by the light source 11 is not limited to white light, and may be monochromatic light having a specific wavelength. The illumination light L1 generated by the light source 11 enters the monochromator 12.

The monochromator 12 extracts and emits monochromatic light of a specific wavelength from the incident illumination light L1. The illumination light L1 emitted from the monochromator 12 is monochromatic light, and enters the fiber 13.

The fiber 13 is a cable-shaped light guide member having one end and the other end. The illumination light L1 incident on one end of the fiber 13 is emitted from the other end of the fiber 13. The illumination light L1 emitted from the other end of the fiber 13 enters the illumination lens 14.

The illumination lens 14 is, for example, a convex lens. The illumination lens 14 changes an angular distribution of the incident illumination light L1, and irradiates the polarizer 15 with the illumination light L1. For example, the illumination lens 14 converts the illumination light L1 emitted from the other end of the fiber 13 into parallel light. Then, the illumination light L1 converted to parallel light is incident on the polarizer 15.

The illumination light L1 generated from the light source 11 is incident on the polarizer 15. The polarizer 15 transmits the illumination light L1 including linearly polarized light in one direction. For example, the polarizer 15 emits the illumination light L1 of linearly polarized light in which the polarization direction is inclined at an angle of 45° with respect to the ground, to the beam splitter 16. For example, the polarizer 15 comprises either or both of a linear polarizer and a polarization retarder.

The beam splitter 16 reflects a portion of the incident illumination light L1 and transmits a portion of the incident illumination light L1. The beam splitter 16 reflects a portion of the incident illumination light L1 toward the objective lens 17. The illumination light L1 reflected by the beam splitter 16 enters the objective lens 17.

The objective lens 17 illuminates the sample 50 with the illumination light L1 containing linearly polarized light. The objective lens 17 condenses the illumination light L1 reflected by the beam splitter 16 into a focused point to illuminate the sample 50. Then, the objective lens 17 transmits the reflected light R1 reflected by the sample 50 by the illumination light L1. In the ellipsometer 1 of the example embodiment, an optical axis C of the illumination light L1 incident on the sample 50 and an optical axis C of the reflected light R1 reflected by the sample 50 are orthogonal to a measurement surface of the sample 50.

The illumination light L1 illuminating the sample 50 includes linear polarization in one direction. The illumination light L1 including such linear polarization in one direction is condensed by the objective lens 17 and is incident on the measurement surface of the sample 50. Therefore, in a case in which the illumination light L1 is fully polarized and linearly polarized, when the optical axis C is orthogonal to the measurement surface of the sample 50, the illumination light L1 has a portion of P polarization and also has a portion of S polarization depending on the orientation of the illumination light L1 incident on the measurement surface of the sample 50. The portion of the S polarized light in the illumination light L1 is reflected from the sample 50 as the S polarized light. The portion of the P polarized light in the illumination light L1 is reflected from the sample 50 as the P polarized light.

The receiving optical system 20 collects the reflected light R1 reflected by the illumination light L1 from the sample 50. The receiving optical system 20 includes the objective lens 17, the beam splitter 16, and relay lenses 21 and 22. The objective lens 17 is also a member of the illumination optical system 10 and is also a member of the receiving optical system 20. The objective lens 17 transmits the reflected light R1 reflected from the sample 50 that is irradiated by the illumination light L1 such that the reflected light R1 enters the beam splitter 16.

The beam splitter 16 transmits a portion of the incident reflected light R1. For example, the reflected light R1 transmitted through the beam splitter 16 is incident on the relay lens 21.

The relay lens 21 converges the reflected light R1 that has been transmitted through the beam splitter 16, to form an image and to be incident on the relay lens 22. The relay lens 22 transmits the incident reflected light R1 to be incident on the polarizing optical device 30.

Figure 2:
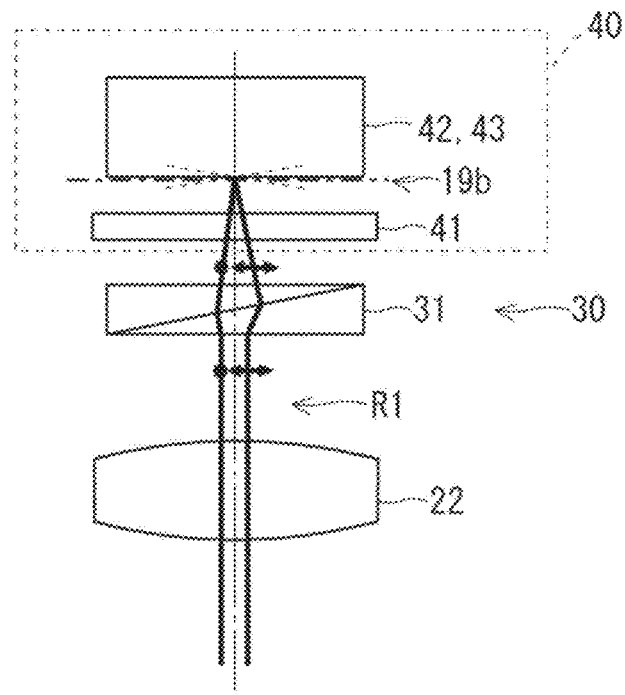
FIG. 2 is a diagram illustrating a polarizing optical device and a light-receiving optical system in the ellipsometer according to an example embodiment.

FIG. 2 is a diagram illustrating a polarizing optical device and a light-receiving optical system in the ellipsometer 1 according to an example embodiment. As illustrated in FIG. 2, the polarizing optical device 30 divides the reflected light R1 reflected from the sample 50 that is irradiate by the illumination light L1 including linearly polarized light, into two fragments of linearly polarized light in polarization directions orthogonal to each other. The polarizing optical device 30 may be, for example, a Nomarski prism 31.

The polarization directions orthogonal to each other separated by the polarizing optical device 30 may be an X direction and a Y direction. In this case, the plane created by the X and Y directions is perpendicular to the optical axis of the reflected light R1. Then, the Nomarski prism 31 divides the reflected light R1 into linearly polarized light in the X direction and linearly polarized light in the Y direction. Then, in the Nomarski prism 31, the separated linear polarization in the X direction and linear polarization in the Y direction are emitted to be deflected to the same point again, on the image detector. However, the polarizing optical device 30 is not limited to a Nomarski prism, and may also include, for example, a Wollaston prism or a Rochon prism.

The light-receiving optical system 40 receives the reflected light R1 to calculate and A. The light-receiving optical system 40 includes an analyzing device 41, an image detector 42, and an image processing unit 43. The analyzing device 41 may be, for example, a polarizing plate.

Figure 3:
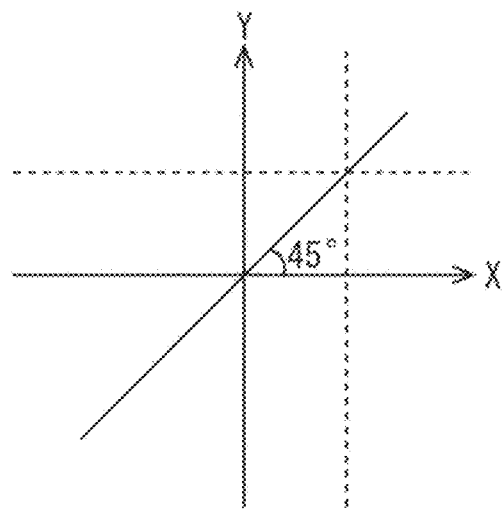
FIG. 3 is a diagram illustrating linearly polarized light transmitted through an analyzing device in the ellipsometer according to an example embodiment.

FIG. 3 is a diagram illustrating linearly polarized light passing through the analyzing device in the ellipsometer 1 according to an example embodiment. As illustrated in FIG. 3, the analyzing device 41 transmits a component of linearly polarized light in a 45° inclined direction with respect to the X-direction polarization direction and the Y-direction polarization direction separated by the polarizing optical device 30, therethrough. Therefore, the analyzing device 41 transmits a polarization component inclined at 45° with respect to the X-direction among linearly polarized light having a polarization direction in the X-direction therethrough. In addition, among the linearly polarized light having a polarization direction in the Y direction, the analyzing device 41 transmits a polarization component inclined at 45° with respect to the Y direction therethrough. Therefore, as two fragments of linearly polarized light orthogonal to each other pass through the analyzing device 41, the two fragments of linearly polarized light are emitted as polarization components polarized in the same direction (the 45° inclined direction). The reflected light R1 including the polarization component transmitted from the analyzing device 41 enters the image detector 42.

The image detector 42 receives the incident reflected light R1. The image detector 42 is disposed in a pupil conjugate position 19b which is conjugated with an exit pupil position 19a of the objective lens 17, that is, a back focal plane of the objective lens 17. The reflected light R1 includes polarization components in the same direction in two orthogonal linear polarizations. Therefore, the reflected light R1 interferes on the image detector 42. Accordingly, an interference fringe is formed on the image detector 42. The image detector 42 detects an interference fringe of each polarization component that has passed through the analyzing device 41.

Figure 4:
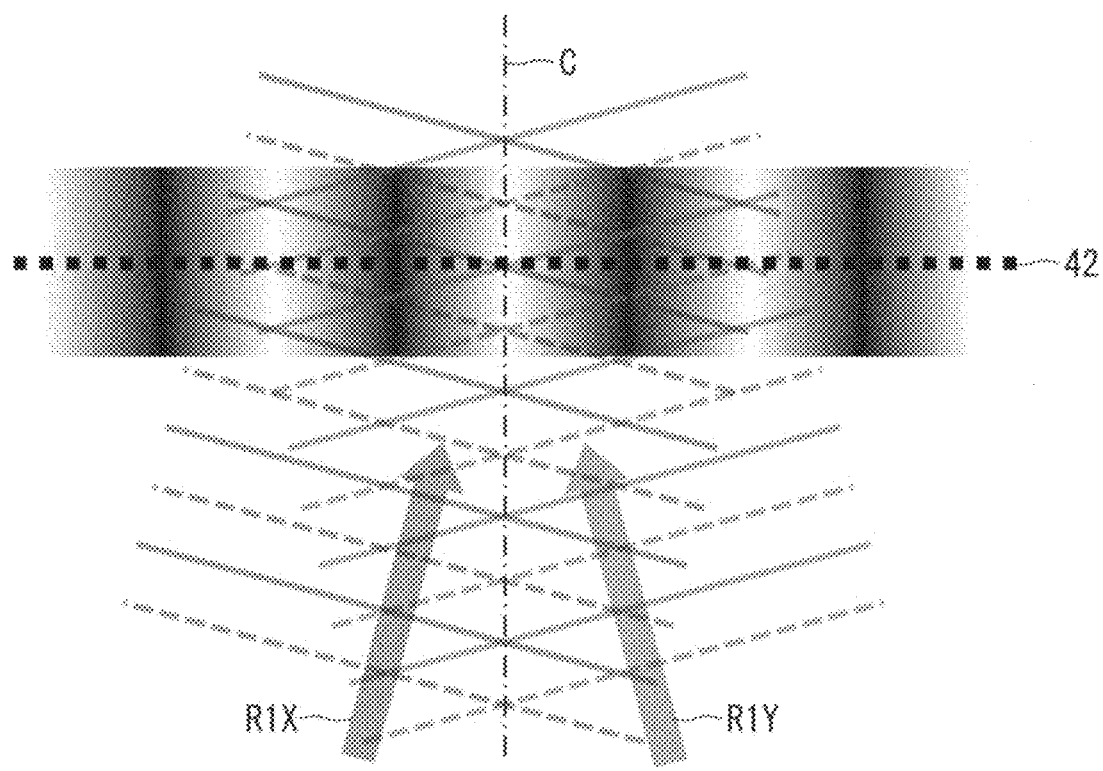
FIG. 4 is a diagram illustrating the wavefront of each linearly polarized light included in the reflected light incident on an image detector in the ellipsometer according to an example embodiment.
Figure 5:
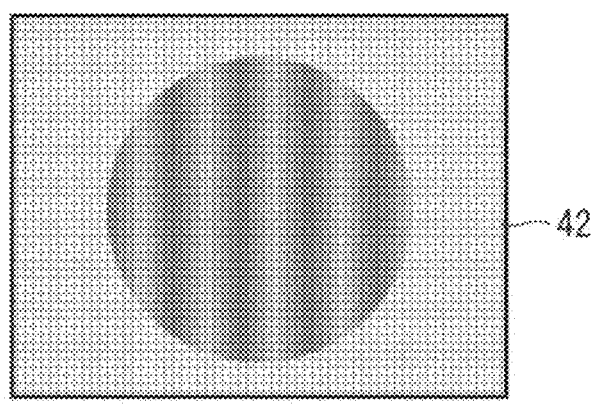
FIG. 5 is a diagram illustrating an interference fringe of reflected light interfering on an image detector in the ellipsometer according to an example embodiment.

FIG. 4 is a diagram illustrating the wavefront of respective linearly polarized light included in reflected light R1 incident on the image detector 42 in the ellipsometer 1 according to the example embodiment. FIG. 5 is a diagram illustrating an interference fringe of reflected light R1 interfering on an image detector 42 in the ellipsometer 1 according to an example embodiment. As illustrated in FIGS. 4 and 5, the reflected light R1 including two fragments of linearly polarized light R1X and R1Y separated by the polarizing optical device 30 passes through the analyzing device 41, and forms an interference fringe on the image detector 42.

The image processing device 43 may be, for example, a personal computer (PC) including a processor. The image processing device 43 calculates Ψ and Δ from the interference fringes detected by the image detector 42. For example, the image processing device 43 calculates the Ψ and Δ, by fitting an intensity distribution Ifringe of the reflected light R1 in the interference fringe, to the following equation (1). In this case, the intensity distribution Ifringe is a function of the position on the image detector 42.

[Equation 1]

$$I_{fringe} = |E_1|^2 + |E_2|^2 + 2|E_1||E_2|\cos(\delta_1 - \delta_2) = |E_1|^2 + |E_2|^2 + 2|E_1||E_2|\cos\Delta \quad (1)$$

In this case, the Ψ is calculated from equation (2).

[Equation 2]

$$\psi : \tan^{-1}\frac{|E_1|}{|E_2|} \quad (2)$$

Figure 6:
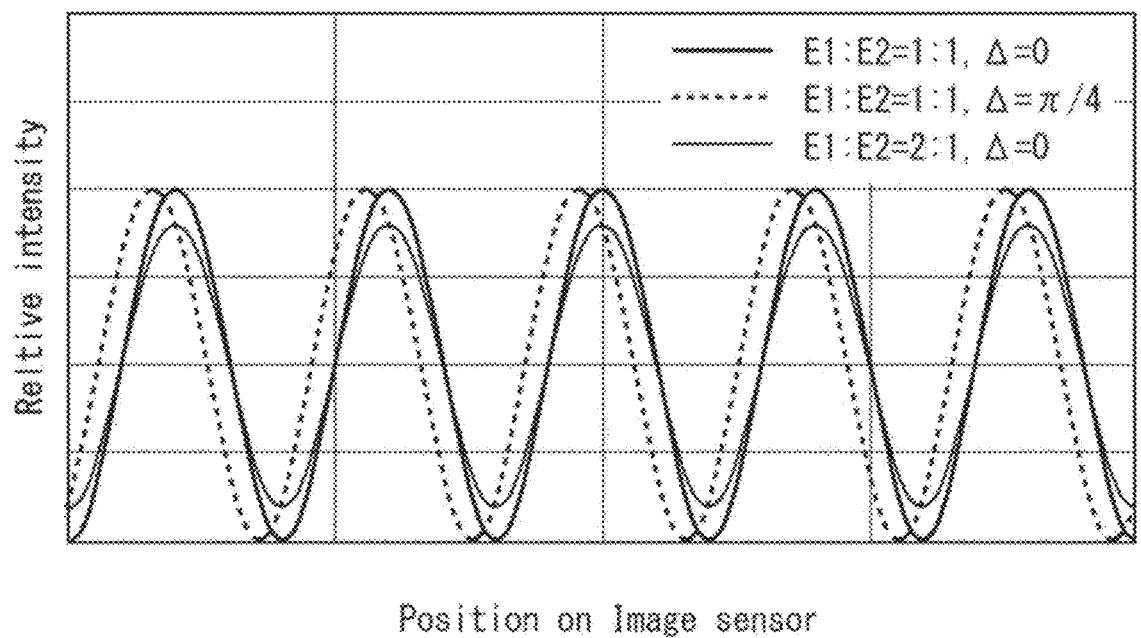
FIG. 6 is a diagram illustrating an Ψ and Δ obtained from the interference fringe on the image detector in the ellipsometer according to an example embodiment.

FIG. 6 is a diagram illustrating the and Δ obtained from the interference fringe on the image detector in the ellipsometer 1 according to the example embodiment. As illustrated in FIG. 6, when a ratio (Ψ) of intensity and a phase difference (Δ) of the two polarizations are changed, the intensity of the reflected light R1 forming the interference fringe on each position of the image detector 42 is changed. Using this relationship, the Ψ and Δ may be obtained from the interference fringe.

For example, for the reflected light R1 having a change in intensity indicated by the bold line, the intensity ratio E1:E2 of the two polarizations is 1:1, and the phase difference Δ is 0. In addition, for the reflected light R1 having the intensity change indicated by the dotted line, the intensity ratio E1:E2 of the two polarizations is 1:1 and the phase difference Δ is $\pi/4$. In addition, for the reflected light R1 having a change in intensity indicated by the thin line, the intensity ratio E1:E2 of the two polarizations is 2:1, and the phase difference Δ is 0. Thus, the light-receiving optical system 40 interferes with the components of two fragments of linearly polarized light by transmitting the linearly polarized light in each of the separated polarization directions (the X-direction and the Y-direction) through the analyzing device 41 having a transmission axis inclined by 45°, thereby calculating the Ψ and Δ from the interference fringes on the image detector 42.

The ellipsometer 1 of the example embodiment uses the polarizing optical device 30 in the measurement of Ψ and Δ. The polarizing optical device 30 divides the reflected light R1 reflected from the sample 50 into two fragments of linearly polarized light R1X and R1Y in the polarization directions orthogonal to each other, and forms the interference fringe from the separated two fragments of linearly polarized light, on the image detector 42. From the measurement results of phase and contrast of the interference fringe, two independent parameters, Ψ and Δ, are directly measured. Accordingly, it is unnecessary to measure the amount of light of at least four polarization components in a time series using a rotating polarizer or compensator.

In addition, in the related measurement of the Ψ and Δ, the Stokes parameter is obtained from the amount of light of a plurality of different polarization states, and the Ψ and Δ are obtained from the obtained Stokes parameters. According to an example embodiment, the Ψ and Δ may be obtained from a direct and single image. Therefore, since measurement may be performed in a relatively short time, the throughput of OCD measurement may be improved.

In addition, compared to the related ellipsometers, since the ellipsometer 1 according to an example embodiment does not include any moving part, Ψ and Δ may be measured more stably.

Furthermore, in most related ellipsometers used in OCD measuring devices, an incident angle of the illumination light L1 incident on the surface of the sample 50 is fixed at a Brewster angle. However, in the example embodiment, by disposing the image detector 42 on the pupil conjugate position, which is conjugate to the exit pupil position of the objective lens 17 of relatively large numerical aperture (NA), the Ψ and Δ at an arbitrary angle of incidence and direction of incidence may be measured. Such a configuration could not be easily implemented in the configuration of a related ellipsometer that rotates an analyzing device or the like.

As a result, for example, in fitting to a microstructure model on a wafer, measurement results under relatively more conditions may be used, and a reduction in coupling of different dimensions, which is often problematic in OCD measuring devices, may be provided. Therefore, improving the precision in the measurement of the current semiconductor structure in which three-dimensionalization progresses may be expected. Furthermore, the illumination area of the sample 50 by the illumination light L1 may be reduced from about φ30 μm to φ1 μm or less, such that the evaluation of the dimensional distribution in the chip may also be performed with relatively higher position resolution. By reflecting these measurement results in lithography, film formation, and etching processes, process control of semiconductor manufacturing may be appropriately performed. Thereby, the yield and productivity in semiconductor manufacturing may be improved.

Furthermore, in the logic, the test pattern for measuring the Ψ and Δ disposed in the semiconductor chip may be reduced up to several μm width corner, from several tens of μm width corner used. For this reason, the area which may be used for a circuit in a semiconductor chip increases, thereby contributing to cost reduction of a semiconductor device.

Figure 7:
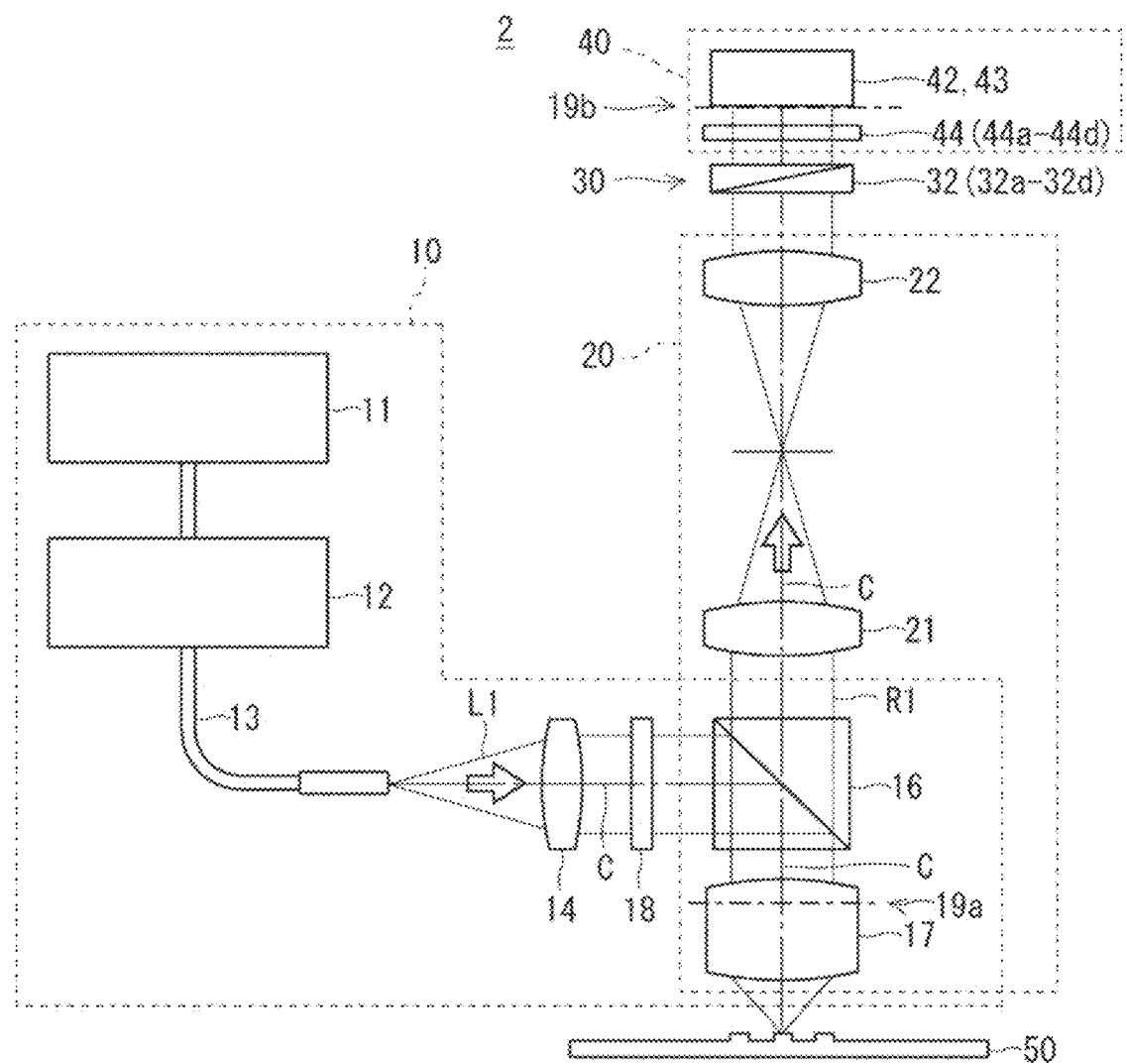
FIG. 7 is a diagram illustrating an ellipsometer according to another example embodiment.

Next, an ellipsometer 2 according to another example embodiment will be described. In an ellipsometer 2 according to the example embodiment, a polarizer 18, a Nomarski prism 32, and an analyzing device 44 are divided into four. FIG. 7 is a configuration diagram illustrating an ellipsometer 2 according to an example embodiment. As illustrated in FIG. 7, the polarizer 18, the Nomarski prism 32 and the analyzing device 44 of the ellipsometer 2 differ from those of the ellipsometer 1 as illustrated in FIG. 1.

Figure 8:
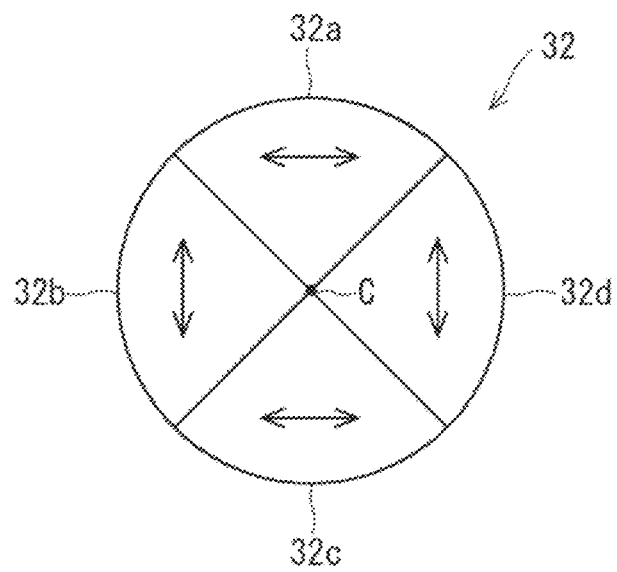
FIG. 8 is a diagram illustrating a plurality of divided pieces of a Nomarski prism and a direction in which each divided piece is divided into two fragments of linearly polarized light in the ellipsometer according to an example embodiment.

FIG. 8 is a diagram illustrating a plurality of divided pieces of a Nomarski prism and a direction in which each divided piece is divided into two fragments of linearly polarized light in the ellipsometer 2 according to the example embodiment. As illustrated in FIG. 8, the Nomarski prism 32 is divided into four within a plane orthogonal to an optical axis C of reflected light R1.

360° centered on the optical axis C is equally divided. For example, the Nomarski prism 32 is divided into four fan-shaped divided pieces 32a, 32b, 32c, and 32d having a central angle of 90°. Each of the divided pieces 32a to 32d divides two fragments of linearly polarized light in a direction orthogonal to the bisector of the central angle.

Therefore, the directions, in which the divided pieces 32a and 32c opposing each other with the optical axis C therebetween are separated, are parallel, and the directions in which the divided pieces 32b and 32d are separated are parallel. The direction in which the divided pieces 32a to 32d are separated is orthogonal to the direction in which the adjacent divided pieces 32a to 32d are separated. For example, the direction in which the divided pieces 32a and 32c are separated is orthogonal to the direction in which the divided pieces 32b and 32d are separated.

The analyzing device 44 is also divided into divided pieces 44a, 44b, 44c, and 44d corresponding to the Nomarski prism 32 that is divided. The analyzing device 44 has a plurality of fan-shaped divided pieces having a central angle in which a rotation angle of one rotation around the optical axis C is equally divided, within a plane orthogonal to the optical axis C of the transmitted reflected light R1. In detail, the analyzing device 44 is divided into four fan-shaped divided pieces 44a to 44d having a central angle of 90°.

The divided pieces 44a to 44d of the analyzing device 44 correspond to the divided pieces 32a to 32d of the Nomarski prism 32, respectively. The reflected light R1 transmitted through the respective divided pieces 32a to 32d is incident on the respective divided pieces 44a to 44d. Therefore, the respective divided pieces 44a to 44d transmits the reflected light R1 in a polarization direction inclined at 45° with respect to the two fragments of linearly polarized light separated by the divided pieces 32a to 32d, therethrough.

The polarizer 18 also includes a plurality of fan-shaped divided pieces having a central angle in which a rotation angle of one rotation around the optical axis C is equally divided, within a plane orthogonal to the optical axis C direction of the transmitted illumination light L1. In detail, the polarizer 18 is divided into four fan-shaped divided pieces 18a, 18b, 18c, and 18d having a central angle of 90°. The divided pieces 18a to 18d of the polarizer 18 correspond to the divided pieces 32a to 32d of the Nomarski prism, respectively. The reflected light R1 transmitted through the respective divided pieces 18a to 18d and reflected by the sample 50 enters the respective divided pieces 32a to 32d.

In the pupil plane on the image detector 42, the central portion is the reflected light R1 when the illumination light L1 is incident perpendicularly to the sample 50. On the other hand, in the pupil plane, the peripheral portion is the reflected light R1 when the illumination light L1 is incident to be tilted with respect to the sample 50. In the measurement by the ellipsometer 2, when the incident angle of the illumination light L1 with respect to the sample 50 is changed, the Ψ and Δ also change.

Therefore, in the example embodiment, the Nomarski prism 32 is divided into four pieces, and the separation direction is set to a direction orthogonal to the bisector of the center angle of each of the divided pieces 32a to 32d. Accordingly, the separation direction has a portion that becomes a tangential direction of a cylinder with the optical axis C as a central axis. When fitting the above-mentioned equation (1) to the interference fringe of the reflected light R1, the equation (1) is fitted to a profile in a certain extent of range. In this case, to provide a predetermined incident angle of the illumination light L1, the profile of the interference fringe along the tangential direction of the cylinder with the optical axis C as the central axis may be used.

Figure 9:
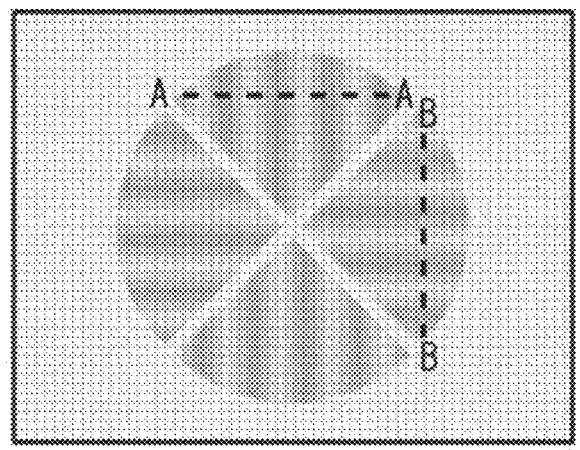
FIG. 9 is a diagram illustrating an interference fringe of reflected light interfering on an image detector in the ellipsometer according to an example embodiment.
Figure 10:
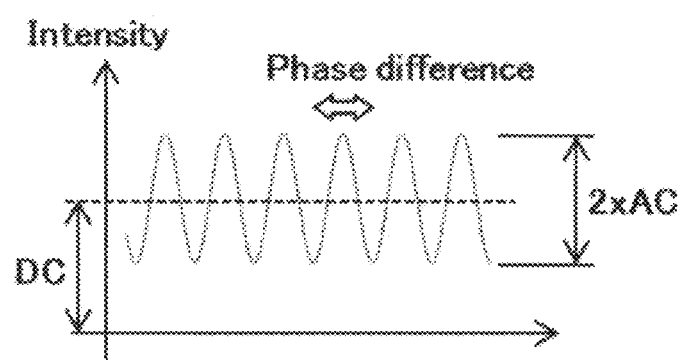
FIG. 10 is a diagram illustrating an interference fringe on an image detector in the ellipsometer according to an example embodiment, and illustrates the intensity of line A-A and line B-B of FIG. 9.

FIG. 9 is a diagram illustrating an interference fringe of reflected light that has interfered on an image detector in the ellipsometer 2 according to the example embodiment. FIG. 10 is a diagram illustrating an interference fringe on an image detector in the ellipsometer 2 according to the example embodiment, and illustrates the intensity in line A-A and line B-B in FIG. 9.

As illustrated in FIGS. 9 and 10, in the ellipsometer 2 according to the example embodiment, the directions in which the interference fringes of the four divided pieces 32a to 32d are listed have a portion along the tangential direction of the cylinder with the optical axis C as the central axis, as illustrated in lines A-A and B-B in FIG. 9. Thus, as illustrated in FIG. 10, the reflected light having a substantially constant incident angle at which the illumination light L1 enters the sample 50 may be fitted. Therefore, the Ψ and Δ may be accurately measured.

As illustrated in FIG. 10, the phase difference Δ is obtained from the position of the interference fringe. In addition, the intensity ratio (Ψ) is obtained from the AC/DC ratio of the interference fringe. In addition, in the example embodiment, the Nomarski prism 32, the analyzing device 44, and the polarizer 18, and the like are divided into four, but embodiments of the present disclosure are not limited thereto. For example, the Nomarski prism 32, the analyzing device 44, and the polarizer 18, and the like may be divided into 8 or 16 pieces, respectively.

Figure 11:
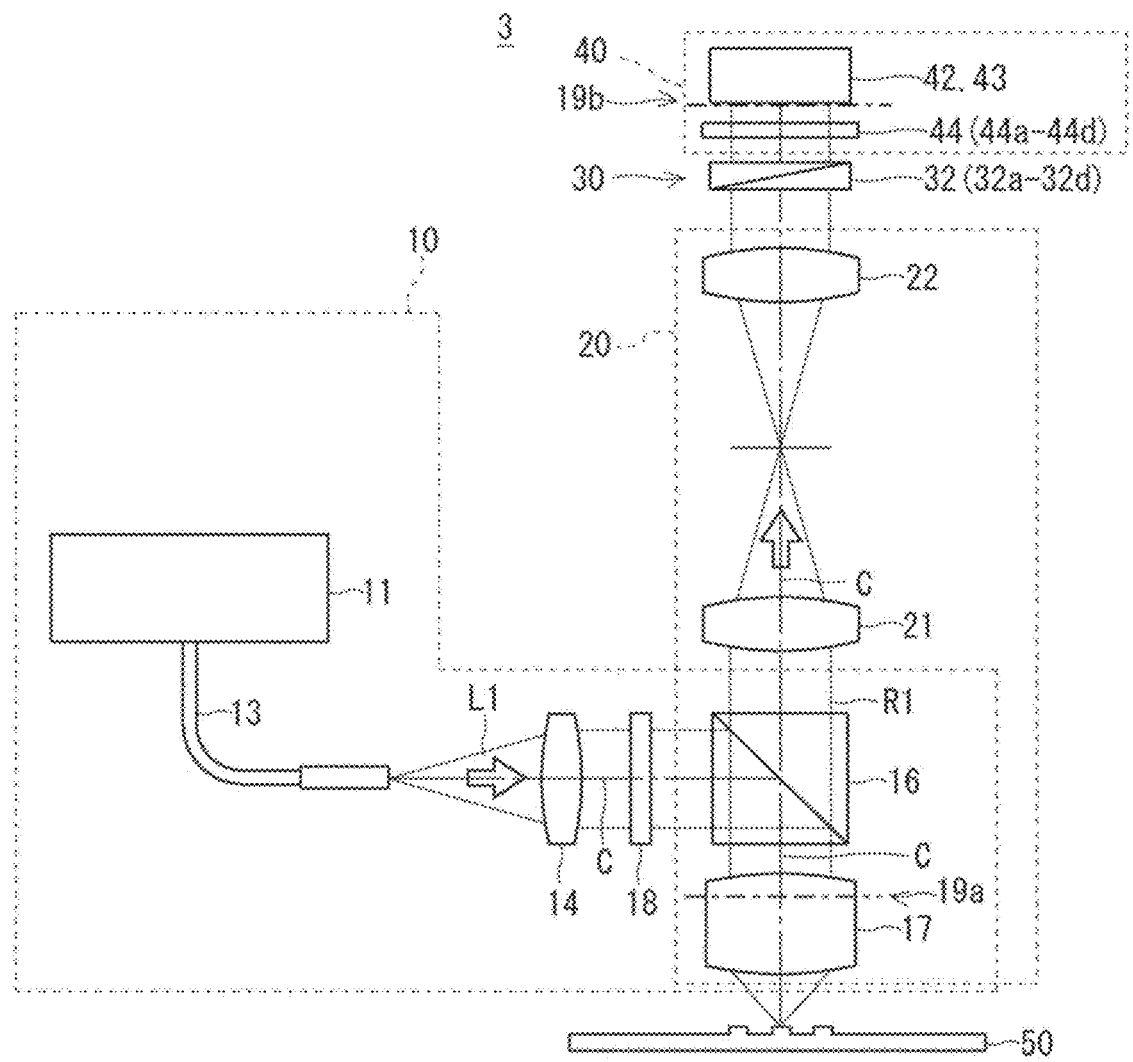
FIG. 11 is a diagram illustrating an ellipsometer according to another example embodiment.

Next, an ellipsometer 3 according to another example embodiment will be described. FIG. 11 is a configuration diagram illustrating an ellipsometer 3 according to the example embodiment. As illustrated in FIG. 11, an ellipsometer 3 does not include a monochromator. The configuration other than this is the same as the configuration of the ellipsometer 2 as illustrated in FIG. 7.

In the ellipsometer 3 of the example embodiment, the illumination light L1 is white light. When the illumination light L1 is monochromatic light, similar to the ellipsometers 1 and 2 as illustrated in FIGS. 1 and 7, the interference fringes in which phases are evenly collected are measured. On the other hand, when the illumination light L1 is white light, the contrast becomes high only in the case in which the phases are evenly gathered.

Figure 12:
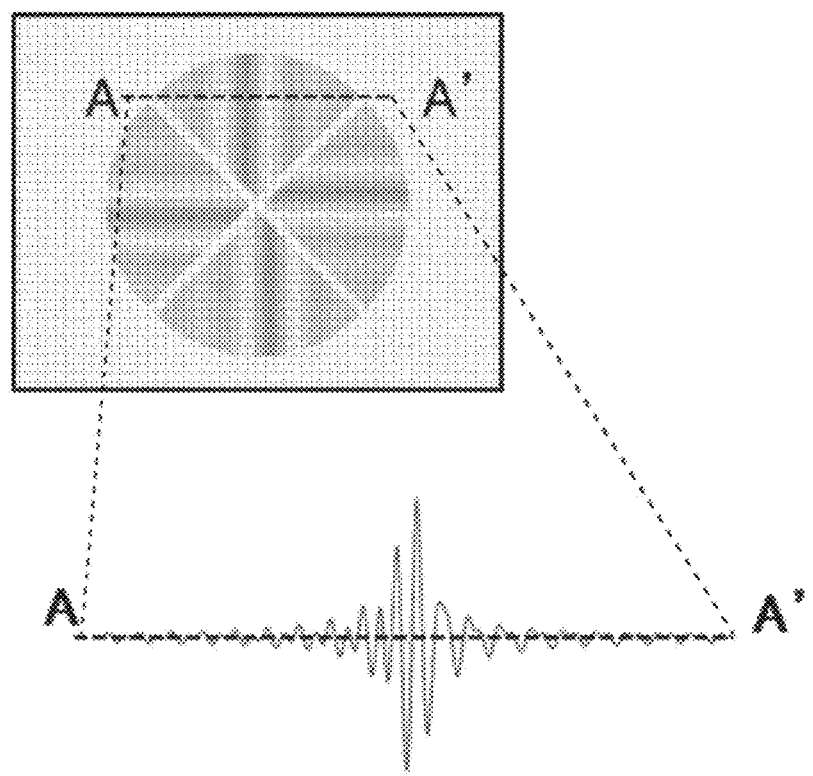
FIG. 12 is a diagram illustrating an interference fringe of reflected light interfering on an image detector in the ellipsometer according to an example embodiment.
Figure 13:
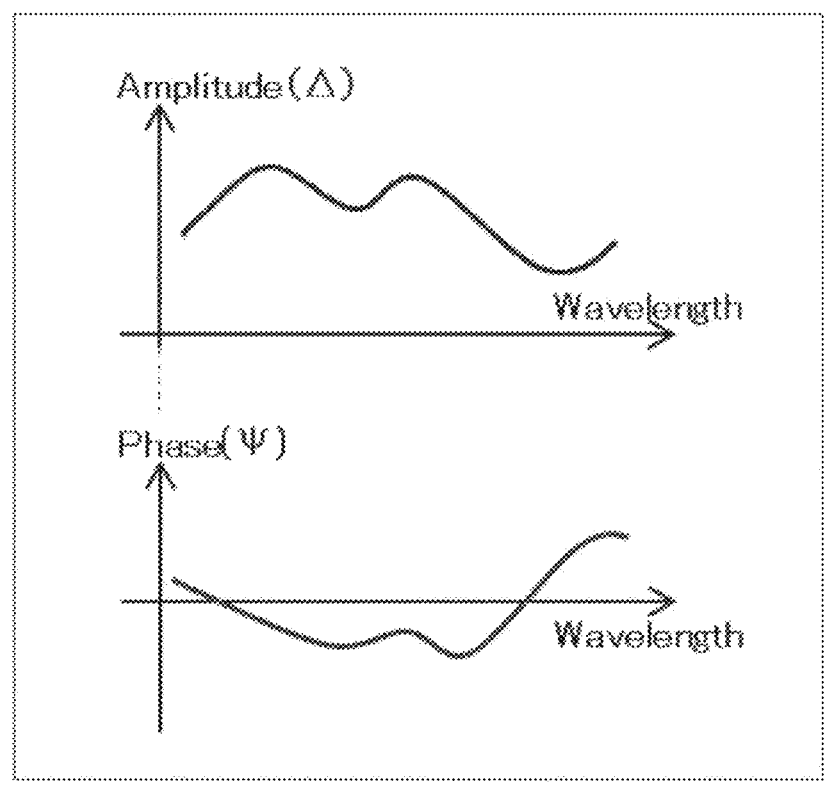
FIG. 13 is a graph illustrating results of Fourier transform of intensity and a phase included in an interference fringe of reflected light interfering on an image detector, with respect to a wavelength of the reflected light, in the ellipsometer according to an example embodiment.

An upper portion in FIG. 12 is a diagram illustrating an interference fringe of reflected light interfering on an image detector in the ellipsometer 3 according to the example embodiment, and a lower portion in FIG. 12 illustrates the intensity along line A-A'. FIG. 13 is a graph illustrating that, in the ellipsometer 3 according to the example embodiment, the intensity distribution of the interference fringe of reflected light that has interfered on the image detector is Fourier transformed and is divided into a real part representing amplitude and an imaginary part, the graph illustrating the result that the frequency is related to the wavelength of the illumination light L1.

As illustrated in FIG. 12, for example, in the case of the interference fringe along the tangential direction of the cylinder with the optical axis C as the central axis, the contrast is relatively high in the central portion in which an optical path difference between two linearly polarized light components that are interfering is relatively small, and the contrast is low on both ends. In the example embodiment, the image processing device 43 performs Fourier transform of the interference fringe, and the Ψ and Δ are calculated from the Fourier transformed interference fringes.

The illumination light L1 of the example embodiment is white light, and includes various wavelengths. The period of the interference fringe also changes depending on the wavelength included in the white light. Therefore, as illustrated in FIG. 13, the intensity of component of each wavelength and the phase of each wavelength are taken out by Fourier transform. Accordingly, the Ψ and Δ are obtained for each wavelength.

According to the example embodiment, the monochromator 12 may not be required. Therefore, the device may be simplified and the costs may be reduced. Also, when measuring at various wavelengths, replacing the monochromator may not be required. Therefore, the measurement time may be shortened.

Next, an ellipsometer 4 according to another example embodiment will be described. In the ellipsometer 4 of the example embodiment, as illustrated in FIG. 14, a polarizing beam splitter 45 is disposed in a light-receiving optical system 40, instead of the analyzing device 41.

Figure 14:
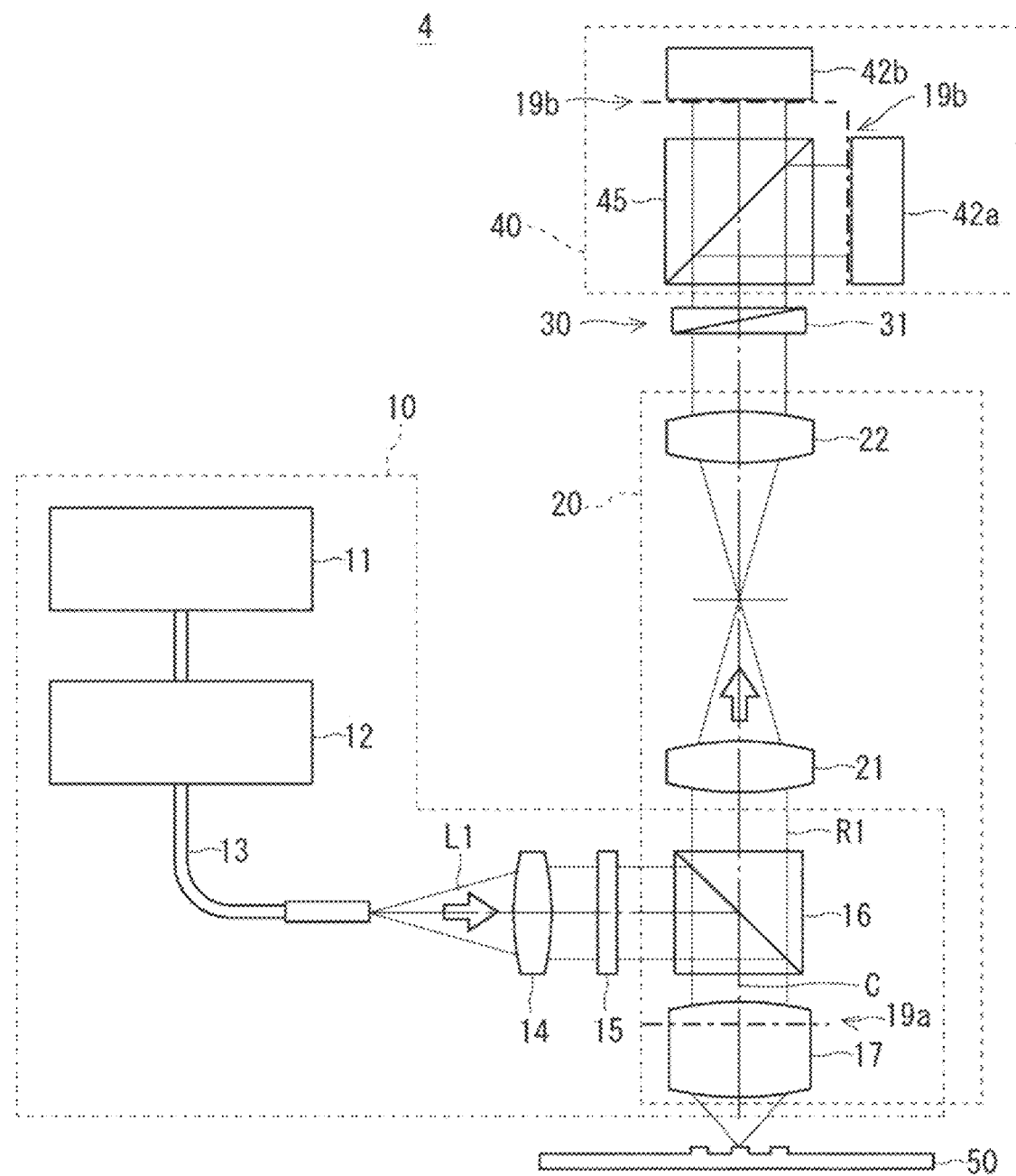
FIG. 14 is a diagram illustrating an ellipsometer according to another example embodiment.

FIG. 14 is a configuration diagram illustrating an ellipsometer 4 according to the example embodiment. As illustrated in FIG. 14, the light-receiving optical system 40 of a ellipsometer 4 includes a polarizing beam splitter 45 and two image detectors 42a and 42b.

In the case of the analyzing device 41 of the above-described example embodiment as illustrated in FIG. 1, for example, 45° components of two fragments of linearly polarized light separated in the polarization directions of 0° and 90° are transmitted and interfered by the polarizing optical device 30. In this case, the analyzing device 41 absorbs or reflects the 135° component.

On the other hand, the polarizing beam splitter 45 of the example embodiment is disposed to reflect the 45° component and to transmit the 135° component. The polarizing beam splitter 45 reflects the components of two fragments of linearly polarized light in directions different from the polarization directions, and also transmits components of two fragments of linearly polarized light in directions orthogonal to the different directions. For example, among respective linear polarizations separated by the polarizing optical device 30, linear polarization in the direction inclined at 45° is reflected and linear polarization in the direction inclined at 135° is transmitted.

An image detector 42 includes the image detectors 42a and 42b. The image detector 42a detects an interference fringe of each polarization component in the 45° direction reflected by the polarizing beam splitter 45. The image detector 42b detects an interference fringe of each polarization component in the 135° direction that passes through the polarizing beam splitter 45.

Figure 15:
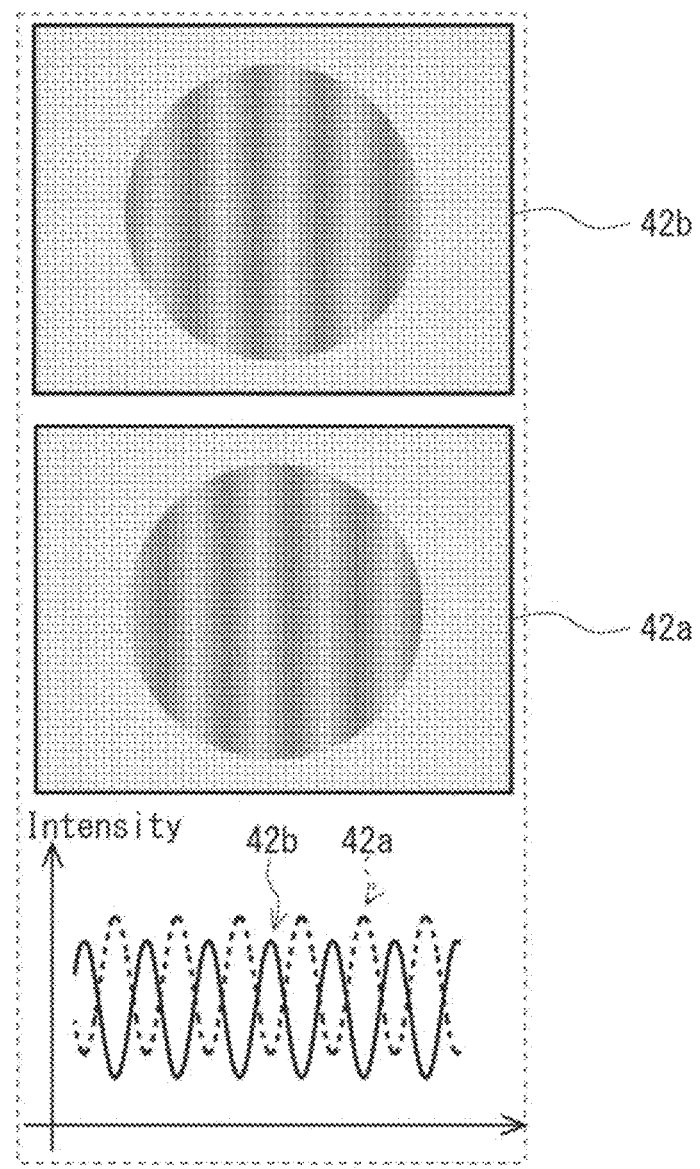
FIG. 15 is a diagram illustrating interference fringes of reflected light interfering on two image detectors in the ellipsometer according to an example embodiment.

FIG. 15 is a diagram illustrating interference fringes of reflected light R1 interfering on two image detectors 42a and 42b in the ellipsometer 4 according to the example embodiment. As illustrated in FIG. 15, on respective image detectors 42a and 42b, an interference fringe of which a phase is inverted 180° is formed.

Figure 16:
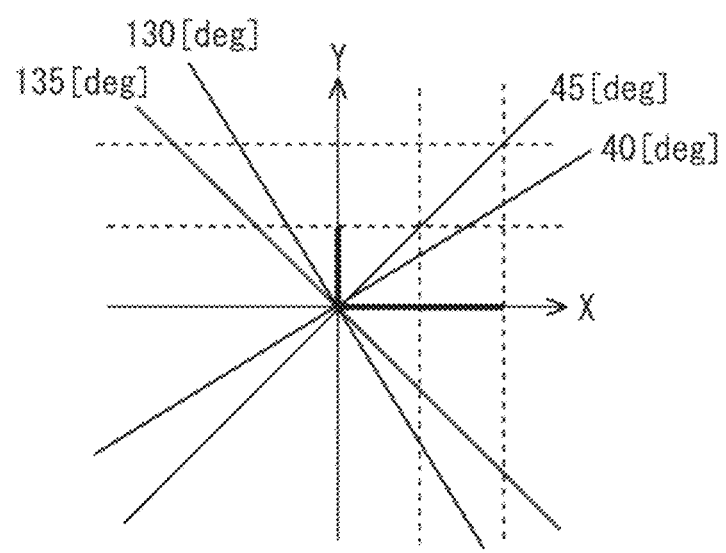
FIG. 16 is a diagram illustrating each component in a case in which a polarization direction of reflection and transmission of a polarizing beam splitter is shifted from 45 degrees with respect to two linear directions separated by a polarizing optical device in the ellipsometer according to an example embodiment.

FIG. 16 is a drawing illustrating the respective components in a case in which the polarization directions of reflection and transmission of the polarizing beam splitter are shifted by 45° with respect to two linear directions separated by the polarizing optical device in the ellipsometer 4 according to the example embodiment.

As illustrated in FIG. 16, when the strengths of the component in the X direction and the component in the Y direction are different, for example, the case in which the strength of the component in the X direction is 2 and the strength of the component in the Y direction is 1 may be examined. When the polarization direction of the reflection and transmission of the polarizing beam splitter 45 is moved from 45° to 40° with respect to two linear directions separated by the polarizing optical device 30, the component in the X direction becomes larger, and the component in the Y direction becomes smaller. Therefore, the difference between the component in the X direction and the component in the Y direction gradually increases, and the contrast decreases.

On the other hand, when moving from 135° to 130°, the component in the X direction becomes small and the component in the Y direction becomes large. Therefore, the difference between the component in the X direction and the component in the Y direction decreases, and the contrast increases. In the example embodiment as illustrated in FIG. 1, of the two fragments of linearly polarized light separated by the polarizing optical device 30, when the intensity of one decreases, the contrast decreases. In this case, it may not be determined which linear polarization is lowered, but in the example embodiment as illustrated in FIG. 14, it can be determined which linear polarization is lowered.

In addition, In FIG. 14, the reflected light R1 reflected and transmitted by the polarizing beam splitter 45 is traveling in two directions in a plane parallel to the ground, but in reality, it is traveling in an inclined direction of 45°.

Next, an ellipsometer 5 according to another example embodiment will be described. The ellipsometer 5 of the example embodiment uses a polarizing beam splitter in which two triangular columns are joined, instead of the polarizing beam splitter in ellipsometer 4 as illustrated in FIG. 14.

Figure 17:
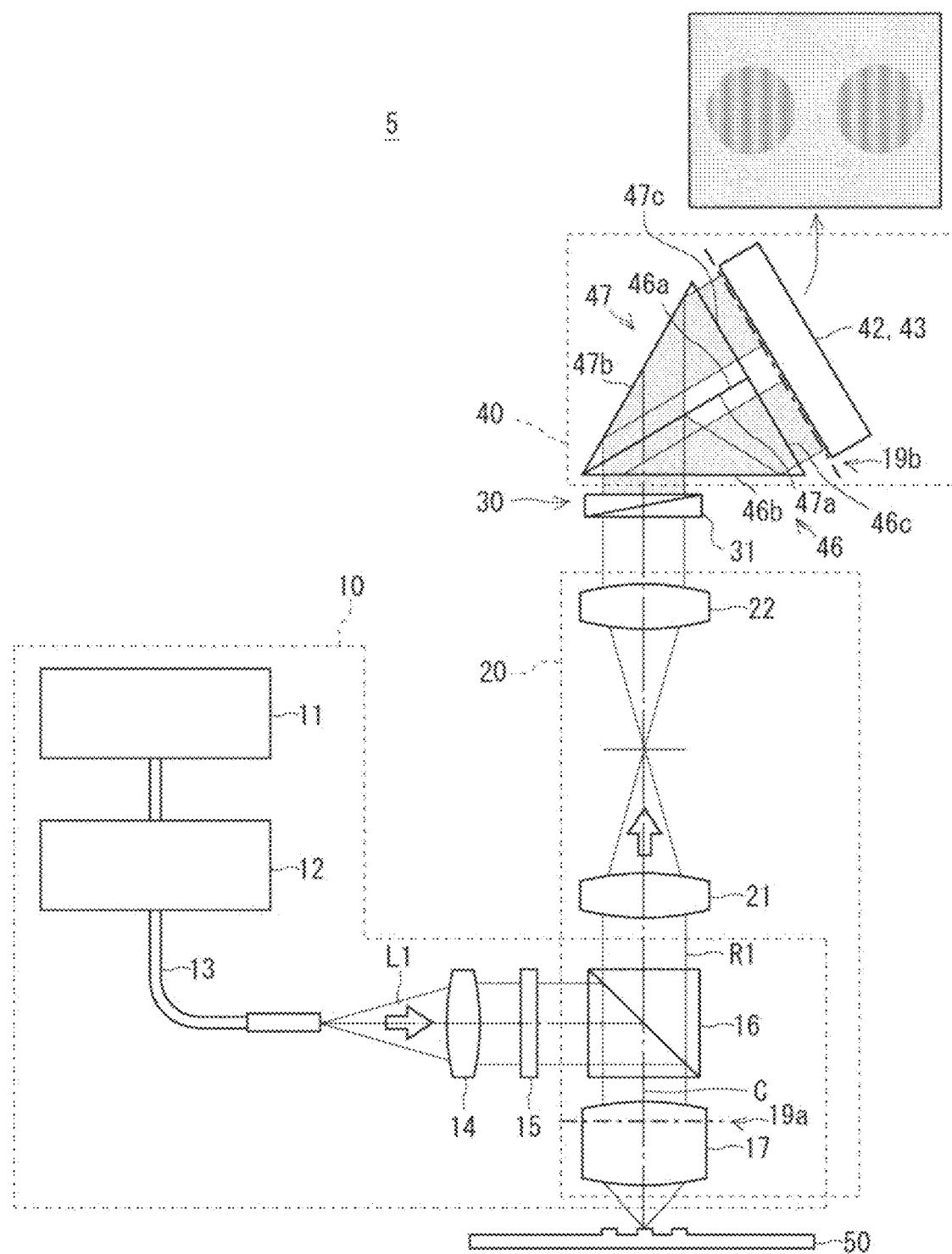
FIG. 17 is a diagram illustrating an ellipsometer according to another example embodiment.

FIG. 17 is a configuration diagram illustrating an ellipsometer 5 according to another example embodiment. As illustrated in FIG. 17, the ellipsometer 5 includes a light-receiving optical system 40 has a polarizing beam splitter in which two triangular columns 46 and 47 are joined. The two triangular columns 46 and 47 have a right triangle as a base. The triangular column 46 has two side surfaces 46a and 46c with a right-angled edge therebetween, and a side face 46b facing the edge, and the angles of the vertices other than the right-angle are 30° and 60°. The triangular column 47 has two side surfaces 47a and 47c with a right-angled edge interposed therebetween, and a side surface 47b facing the edge, and is line-symmetrical with the triangular column 46 with respect to the side surface 47a as an axis. The side surface 46a of the triangular column 46 and the side surface 47a of the triangular column 47 are joined. The side surfaces 46a and 47a, which are the bonding surfaces, reflect, for example, linearly polarized light in a 45° inclined direction, and also transmits linearly polarized light in a 135° inclined direction, among respective fragments of linearly polarized light separated by the polarizing optical device 30.

The reflected light R1 is incident from the side surface 46b of the triangular column 46. In the case of incidence, a polarizing beam splitter is provided so that the optical axis C of the reflected light R1 is orthogonal to the side surface 46b. The incident reflected light R1 is reflected and transmitted from the side surfaces 46a and 47a which are bonding surfaces. The reflected light R1 is reflected from the side surface 46b of the triangular column. In this case, when a glass material of the triangular column 46 is appropriately selected, the reflected light R1 is totally reflected from the side surface 46b. The reflected light R1 reflected from the side surface 46b is emitted from the side surface 46c of the triangular column 46.

The reflected light R1 transmitted through the side surfaces 46a and 47a which are the bonding surfaces is reflected by the side surface 47b of the triangular column 47. Also in this case, by properly selecting the glass material of the triangular column 47, the reflected light R1 is totally reflected from the side surface 47b. The reflected light R1 reflected from the side surface 47b is emitted from the side surface 47c of the triangular column 47.

Thus, the polarizing beam splitter of the example embodiment transmits components of two linearly polarizations in different directions (for example, the 135° direction) orthogonal to each other, while reflecting components of two linearly polarizations in directions (for example, the 45° direction) different from respective polarization directions. Then, the polarizing beam splitter emits respective reflected components and respective transmitted components onto the pupil plane of the same image detector 42. For example, the polarizing beam splitter emits each component reflected and each component transmitted, in the same direction.

With this configuration, the reflected light R1 reflected and transmitted by the polarizing beam splitter is emitted from the side surfaces 46c and 47c of the two triangular columns 46 and 47. For this reason, the reflected light R1 may be received by one image detector 42.

In addition, similarly to the ellipsometer 4 as illustrated in FIG. 14, when the reflection and transmission polarization directions in the polarizing beam splitter are shifted by 45° with respect to the two linear directions separated by the polarizing optical device 30, the intensity ratio in the two linear directions may be more easily obtained. Therefore, it can be determined which linear polarization is lowered.

Next, an ellipsometer 6 according to another example embodiment will be described. The ellipsometer 6 of the example embodiment enables illumination light to be incident at a tilted angle. The sample is point-illuminated, and an image detector is placed on a pupil position of a receiving lens or on a back focal plane of the receiving lens in other words.

Figure 18:
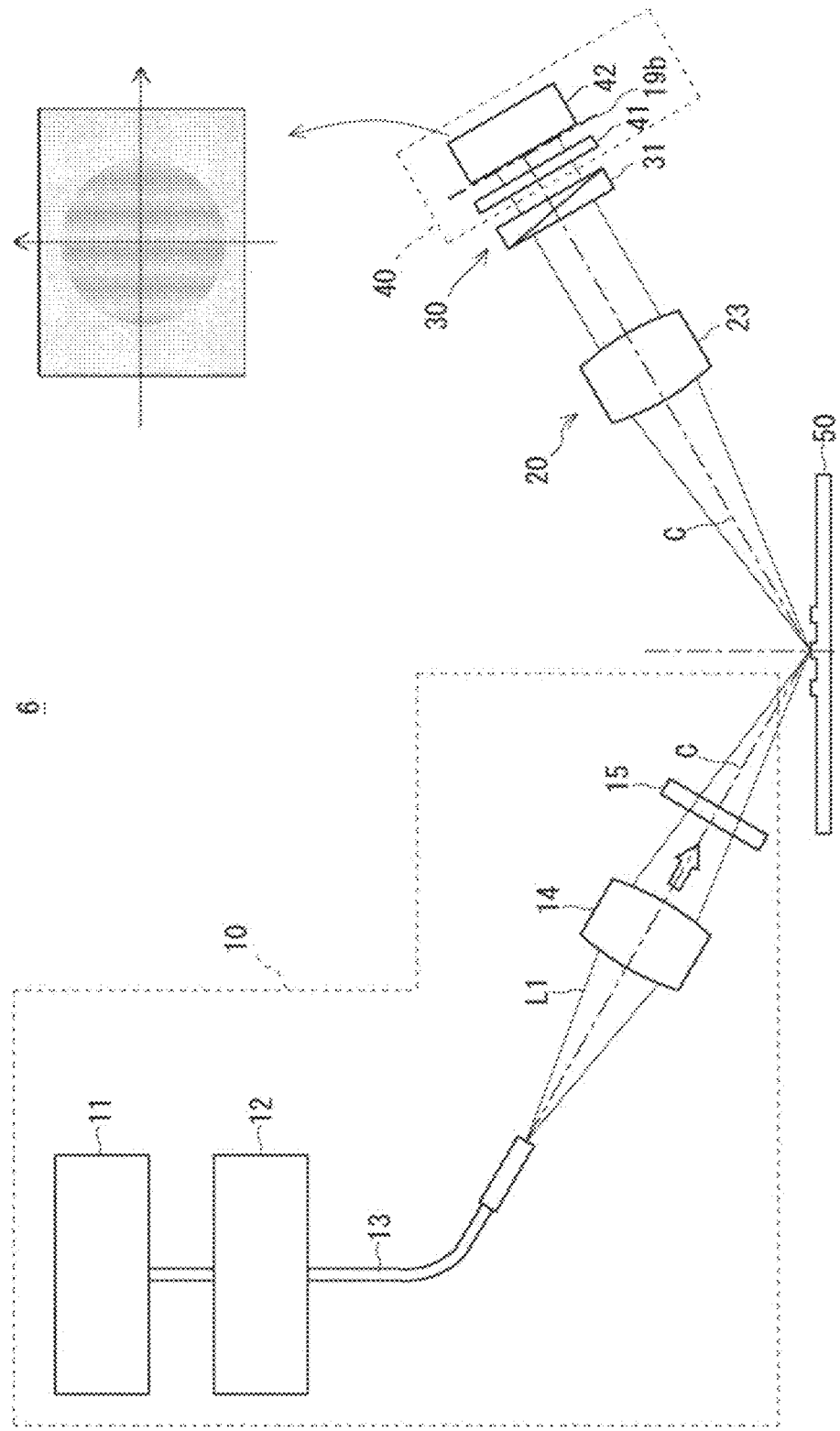
FIG. 18 is a diagram illustrating an ellipsometer according to another example embodiment.

FIG. 18 is a configuration diagram illustrating an ellipsometer 6 according to an example embodiment. As illustrated in FIG. 18, an ellipsometer 6 of this example embodiment includes an illumination optical system 10, a receiving optical system 20, a polarizing optical device 30, and a light-receiving optical system 40.

The illumination optical system 10 illuminates a sample 50 with illumination light L1 including linearly polarized light. The illumination optical system 10 includes a light source 11, a monochromator 12, a fiber 13, an illumination lens 14, and a polarizer 15. The illumination optical system 10 does not include a beam splitter and an objective lens. In addition, an optical axis C of the illumination light L1 incident on the sample 50 is inclined with respect to the measurement surface of the sample 50.

The illumination light L1 generated by the light source 11 enters the monochromator 12. The monochromator 12 extracts monochromatic light of a specific wavelength from the incident illumination light L1 and emits the monochromatic light to the fiber 13. The monochromator 12 selects and emits monochromatic light having a predetermined wavelength ranging from ultraviolet light to infrared light as the illumination light L1. The illumination light L1 incident on one end of the fiber 13 is emitted from the other end of the fiber 13. The illumination light L1 emitted from the other end of the fiber 13 enters the illumination lens 14.

The illumination lens 14 illuminates the sample 50 by condensing incident illumination light L1 into a focused point through the polarizer 15. On the polarizer 15, the illumination light L1 generated from the light source 11 is incident, and the illumination light L1 including linear polarization in one direction is transmitted. Therefore, the illumination lens 14 point-illuminates one point of the sample 50 in the illumination light L1 containing linearly polarized light.

The receiving optical system 20 includes a receiving lens 23. The receiving lens 23 transmits reflected light R1 reflected from the sample 50 by the illumination light L1 therethrough to be incident on the polarizing optical device 30. The optical axis C of the reflected light reflected from the sample 50 is inclined with respect to a measurement surface of the sample 50. An image detector 42 is disposed on a pupil conjugate position 19b of the receiving lens 23. optical device According to the ellipsometer 6 of the example embodiment, the Ψ and Δ may be directly measured even in the configuration of oblique incidence often seen in a related ellipsometer.

Figure 19:
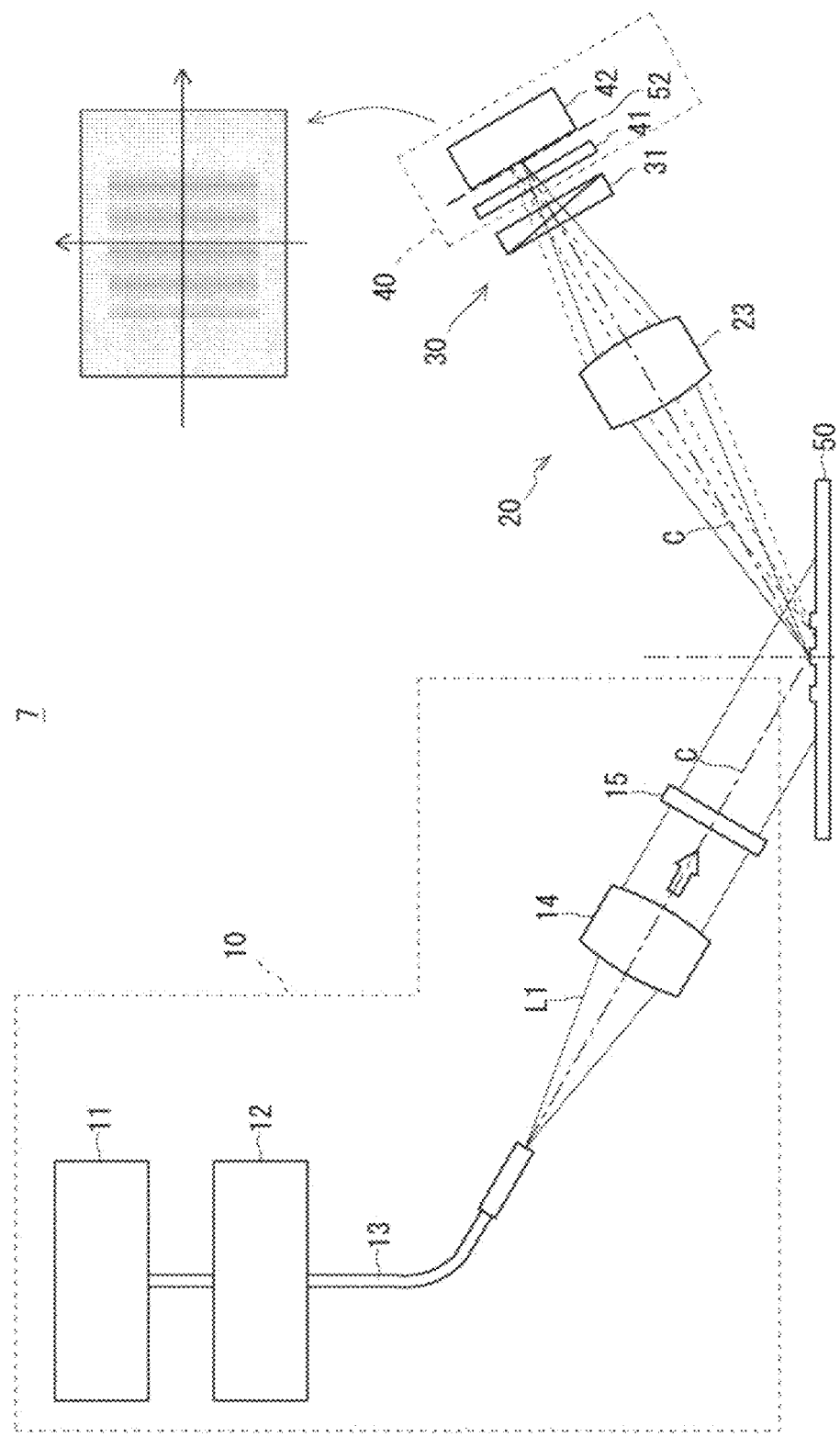
FIG. 19 is a diagram illustrating an ellipsometer according to another example embodiment.

Next, an ellipsometer 7 according to an example embodiment will be described. The ellipsometer 7 of the example embodiment measures an area having diffusion on a sample by surface-incidence through an illumination lens. FIG. 19 is a configuration diagram illustrating an ellipsometer 7 according to the example embodiment.

As illustrated in FIG. 19, in an ellipsometer 7 of the example embodiment, an illumination lens 14 does not spot irradiate the sample 50, but surface-irradiates the sample 50. For example, the illumination lens 14 illuminates a region with a predetermined diffusion of the illumination light L1 in the sample 50. For example, the illumination lens 14 illuminates the sample 50 with illumination light L1 formed of parallel light. An image detector 42 is not disposed on the pupil position, but disposed on an image position 52 of the sample 50 formed by the receiving lens 23. For example, the image detector 42 is disposed inclined with respect to an optical axis C to satisfy a condition of shine proof. The image detector 42 measures an area having diffusion on the sample 50.

In the ellipsometer 7 of the example embodiment, since the incident angle at which the illumination light L1 enters the sample 50 is constant, the image detector 42 disposed on the image position 52 may detect interference fringes as an image.

Next, an ellipsometer 8 according to another example embodiment will be described. In the ellipsometer 8 of the example embodiment, a beam displacer is disposed in an image space, instead of disposing a Nomarski prism in the pupil space. The pupil space is a space in which the reflected light of the illumination light illuminating one point on the sample 50 is parallel, and the image space is a space in which the reflected light is condensed and diffused.

Figure 20:
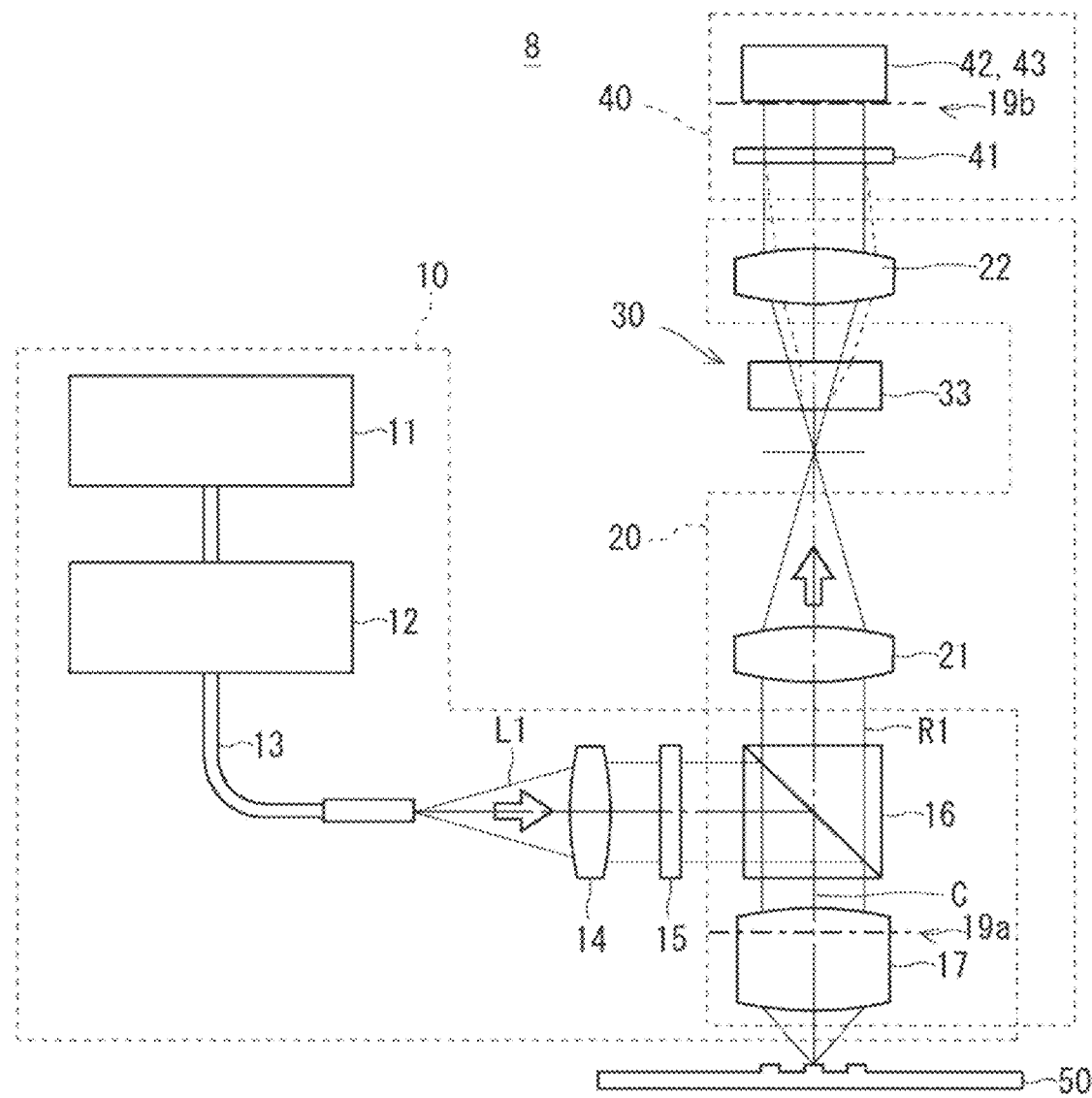
FIG. 20 is a diagram illustrating an ellipsometer according to another example embodiment.
Figure 21:
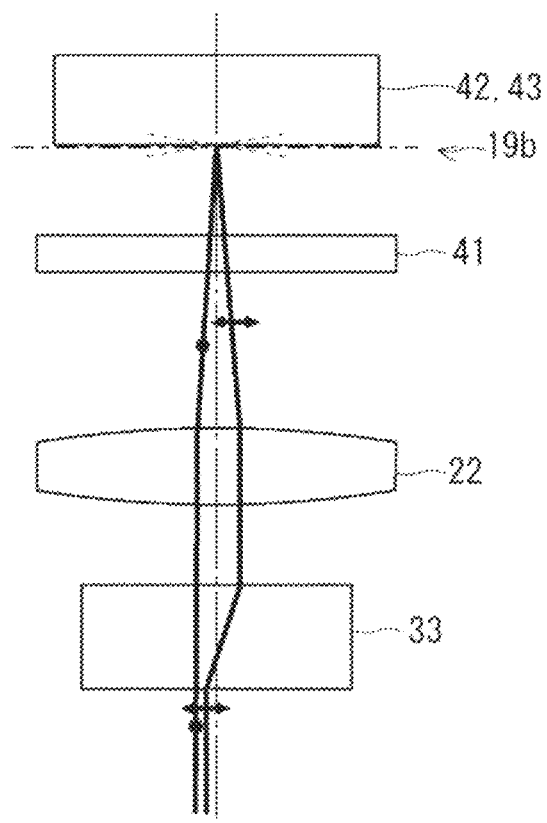
FIG. 21 is a diagram illustrating a polarizing optical device and a light-receiving optical system in the ellipsometer according to an example embodiment.

FIG. 20 is a configuration diagram illustrating an ellipsometer 8 according to the example embodiment. FIG. 21 is a configuration diagram illustrating a polarizing optical device and a light-receiving optical system in the ellipsometer 8. As illustrated in FIGS. 20 and 21, in an ellipsometer 8, a polarizing optical device 30 is a beam displacer 33.

The beam displacer 33 is disposed in the image space between a relay lens 21 and a relay lens 22. For example, the beam displacer 33 is disposed between a focal point of the relay lens 22 and the relay lens 22, and therefore, is disposed in the region in which reflected light R1 is emitted.

The beam displacer 33 divides reflected light R1 reflected from a sample 50 by illumination light L1 including linearly polarized light into two fragments of linearly polarized light in polarization directions orthogonal to each other. When the beam displacer 33 emits two separated linear polarizations, one linear polarization is shifted in parallel and emitted. The reflected light R1 including the two fragments of linearly polarized light emitted from the beam displacer 33 enters the relay lens 22.

The relay lens 22 focuses the incident reflected light R1 on an image detector 42 through an analyzing device 41. In detail, the relay lens 22 emits the separated X-direction linear polarization and Y-direction linear polarization to become the same point on the image detector.

The analyzing device 41 transmits two linear polarization components in the direction inclined by 45° with respect to the X-direction and Y-direction polarization directions separated by the beam displacer 33. Therefore, two fragments of linearly polarized light orthogonal to each other are transmitted through the analyzing device 41, to be emitted as a polarization component polarized in the same direction (the 45° inclined direction). The reflected light R1 including the polarization component emitted from the analyzing device 41 enters the image detector 42.

According to the ellipsometer 8 of the example embodiment, the beam displacer 33 may be used as the polarizing optical device 30. Therefore, instead of disposing the polarizing optical device 30 in the pupil space, the polarizing optical device 30 may also be disposed in the image space.

Next, an inspection device for a semiconductor device according to an example embodiment will be described. The inspection device for a semiconductor device according to the embodiment includes the ellipsometers described in the example embodiments. Therefore, in the inspection device of the semiconductor device according to the example embodiment, the time required for inspection of the semiconductor device may be reduced. In addition, inspection precision may be improved, contributing to the reduction in size of semiconductor devices.

As set forth above, according to an example embodiment, an ellipsometer and an inspection device for a semiconductor device, in which a throughput of measuring an Ψ and Δ may be improved, may be provided.

Example embodiments are not limited to the above-described embodiments, and can be appropriately changed within a range not departing from the scope of the present inventive concept. For example, the respective configurations of the example embodiments may be mutually combined.

While example embodiments have been illustrated and described above, it will be apparent to those skilled in the art that modifications and variations could be made without departing from the scope of the present inventive concept as defined by the appended claims.

What is claimed is:

1. An ellipsometer comprising:
a polarizing optical device configured to separate light, reflected from a sample that is irradiated with an illumination light comprising a linearly polarized light, into a first linearly polarized light in a first polarization direction and a second linearly polarized light in a second polarization direction that is orthogonal to the first polarization direction; and
a light-receiving optical system configured to calculate Ψ(Psi) and Δ(Delta), an amplitude ratio and a phase difference of the two polarized lights respectively, from an interference fringe formed by interference between the first linearly polarized light and the second linearly polarized light after passing through an analyzing device with a transmission axis different from the first polarization direction and the second polarization direction.

2. The ellipsometer of claim 1, further comprising:
a light source configured to emit the illumination light;
a polarizer irradiated by the illumination light emitted from the light source and configured to transmit the illumination light comprising the linearly polarized light in one direction; and
an objective lens configured to illuminate the sample with the illumination light comprising the linearly polarized light and transmit the reflected light reflected from the sample,
wherein the light-receiving optical system comprises:
an image detector comprising one or two dimension detector arrays configured to detect the interference fringe; and
an image processing device configured to calculate the ψ(Psi) and the Δ(Delta) based on the interference fringe.

3. The ellipsometer of claim 2, wherein an optical axis of the illumination light incident on the sample, and an optical axis of the reflected light reflected from the sample are orthogonal to a measurement surface of the sample and coaxial to each other at least adjacent to the sample.

4. The ellipsometer of claim 2, wherein the objective lens is configured to illuminate the sample on a front focal plane of the objective lens by condensing the illumination light into a focused point, and
wherein the image detector is disposed on a back focal plane of the objective lens or conjugate position of the back focal plane of the objective lens.

5. The ellipsometer of claim 2, wherein the light-receiving optical system further comprises the analyzing device comprising a linear polarizer configured to transmit polarization components of the first linearly polarized light and the second linearly polarized light in directions inclined by 45 degrees with respect to the first polarization direction and the second polarization direction, respectively, and
wherein the image detector is configured to detect the interference fringe of each of the components of the first linearly polarized light and the second linearly polarized light transmitted through the analyzing device.

6. The ellipsometer of claim 2, wherein the light-receiving optical system further comprises the analyzing device comprising a polarizing beam splitter configured to reflect polarization components of the first linearly polarized light and the second linearly polarized light in different directions from the first polarization direction and the second polarization direction, respectively, and transmit the polarization components of the first linearly polarized light and the second linearly polarized light in directions orthogonal to reflecting polarization directions, and
wherein the image detector comprises:
a first image detector configured to detect the interference fringe of each of the components reflected by the polarizing beam splitter; and
a second image detector configured to detect the interference fringe of each of the components transmitted through the polarizing beam splitter.

7. The ellipsometer of claim 2, wherein the light-receiving optical system comprises the analyzing device comprising a polarizing beam splitter configured to reflect polarization components of the first linearly polarized light and the second linearly polarized light in different directions from the first polarization direction and the second polarization direction, respectively, and transmit the polarization components of the first linearly polarized light and the second linearly polarized light in directions orthogonal to reflecting polarization directions,
wherein the polarizing beam splitter is configured to redirect the reflected components and the transmitted components onto a same image detector.

8. The ellipsometer of claim 2 wherein the polarizer irradiated by the illumination light comprises either or both of a linear polarizer and a polarization retarder.

9. The ellipsometer of claim 1, further comprising:
a light source configured to emit the illumination light;
a polarizer irradiated by the illumination light emitted from the light source and configured to transmit the illumination light comprising the linearly polarized light in one direction;
an illumination lens configured to transmit the illumination light comprising the linearly polarized light to the sample; and
a receiving lens configured to transmit the reflected light reflected from the sample,
wherein the light-receiving optical system comprises:
an image detector comprising one or two dimension detector array configured to detect the interference fringe; and
an image processing device configured to calculate the ψ(Psi) and the Δ(Delta) based on the interference fringe.

10. The ellipsometer of claim 9, wherein an optical axis of the illumination light incident on the sample, and an optical axis of the reflected light reflected from the sample are inclined symmetrically with respect to a normal axis of a measurement surface of the sample at least adjacent to the sample.

11. The ellipsometer of claim 9, wherein the illumination lens is configured to illuminate the sample on a front focal plane of the illumination lens by condensing the illumination light into a focused point, and wherein the image detector is disposed on a back focal plane of the receiving lens or a conjugate position of the back focal plane of the receiving lens.

12. The ellipsometer of claim 9, wherein the illumination lens is configured to illuminate the sample on a front focal plane of the illumination lens by condensing the illumination light into an area having a predetermined diffusion in the sample, and wherein the image detector is disposed on an image position of the sample.

13. The ellipsometer of claim 1, wherein the polarizing optical device is a Nomarski prism.

14. The ellipsometer of claim 13, wherein the Nomarski prism comprises a plurality of divided pieces each having a fan shape and a central angle in which a rotation angle of one rotation around an optical axis is equally divided within a plane orthogonal to the optical axis of the reflected light, and wherein each of the plurality of divided pieces is configured to separate the first linearly polarized light and the second linearly polarized light in a direction orthogonal to a bisector of the central angle.

15. The ellipsometer of claim 1, wherein the polarizing optical device comprises a Wollaston prism or a Rochon prism.

16. The ellipsometer of claim 1, wherein the polarizing optical device is a beam displacer configured to separate the linearly polarized light on one side to be parallel.

17. The ellipsometer of claim 1, wherein the illumination light is a monochromatic light.

18. The ellipsometer of claim 1, wherein the illumination light is white light having broadband wavelength, and wherein the light-receiving optical system comprises:

an image detector comprising one or two dimension detector array configured to detect the interference fringe; and an image processing device configured to Fourier-transform the interference fringe and calculate $\psi$(Psi) and $\Delta$(Delta), the amplitude ratio and the phase difference of two polarized light respectively, based on an amplitude and a phase of a Fourier-transformed interference fringe.

19. The ellipsometer of claim 1, wherein the illumination light comprises either a fully linearly polarized light or a fully elliptically polarized light.

20. The ellipsometer of claim 1 wherein the $\psi$(Psi) and the $\Delta$(Delta) value is calculated by a fringe contrast and a phase value respectively by means either of fitting of a periodic function or Fourier transformation of the interference fringe.

* * * * *